United States Patent
Mueller

(10) Patent No.: US 9,638,364 B2
(45) Date of Patent: May 2, 2017

(54) COUPLING UNIT, COUPLING DEVICE, MOTOR VEHICLE AND METHOD

(71) Applicant: GM GLOBAL TECHNOLOGY OPERATIONS LLC, Detroit, MI (US)

(72) Inventor: Richard Mueller, Bischofsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 154 days.

(21) Appl. No.: 14/530,268

(22) Filed: Oct. 31, 2014

(65) Prior Publication Data

US 2015/0115595 A1    Apr. 30, 2015

(30) Foreign Application Priority Data

Oct. 31, 2013    (DE) .................. 10 2013 018 344

(51) Int. Cl.
| | |
|---|---|
| *F16L 21/03* | (2006.01) |
| *F16L 37/088* | (2006.01) |
| *F16J 9/00* | (2006.01) |
| *F16D 25/00* | (2006.01) |

(52) U.S. Cl.
CPC .............. *F16L 21/03* (2013.01); *F16D 25/00* (2013.01); *F16J 9/00* (2013.01); *F16L 37/088* (2013.01)

(58) Field of Classification Search
CPC .. F16L 21/03; F16L 37/088; F16J 9/00; F16D 25/00
See application file for complete search history.

(56) References Cited

U.S. PATENT DOCUMENTS

| | | | |
|---|---|---|---|
| 3,853,336 A | 12/1974 | Shank | |
| 4,191,384 A | 3/1980 | Svedberg | |
| 4,362,323 A | 12/1982 | Lodder et al. | |
| | (Continued) | | |

FOREIGN PATENT DOCUMENTS

| | | | | |
|---|---|---|---|---|
| DE | 10065225 A | 7/2002 | | |
| DE | 102007008066 A1 | * | 8/2008 | ............ F16L 13/142 |
| | (Continued) | | | |

OTHER PUBLICATIONS

German Search Report for corresponding Application No. 102013018344.8 (2014; 3 pages).*

(Continued)

*Primary Examiner* — Rodney Mintz
(74) *Attorney, Agent, or Firm* — Lorenz & Kopf, LLP.

(57) ABSTRACT

A coupling unit is disclosed which includes a sleeve opening that extends in the longitudinal direction and into which at least one medium-conveying plug element can be at least partially inserted, A support sleeve includes at least one circumferential pocket on an inner side that faces a plug element and defines the sleeve opening transverse to the longitudinal direction. A sliding element is arranged in the pocket and movably transferred from a release position into a coupling position during the insertion of the plug element. A sealing element is arranged between the sliding element and the pocket of the support sleeve in the release position and pre-stressed in the direction of the plug element. The sealing element is released by the sliding element in the coupling position in order to close and seal a potential gap formed between the support sleeve and the plug element.

16 Claims, 3 Drawing Sheets

(56) References Cited

U.S. PATENT DOCUMENTS

| | | | | |
|---|---|---|---|---|
| 6,173,968 B1* | 1/2001 | Nelson | ............... | F16J 15/166 |
| | | | | 277/584 |
| 6,186,557 B1* | 2/2001 | Funk | ............... | F16L 37/088 |
| | | | | 285/308 |
| 6,679,528 B1 | 1/2004 | Poder | | |
| 7,063,359 B2 | 6/2006 | Vallee | | |
| 8,025,315 B2* | 9/2011 | Schreckenberg | ..... | F16L 13/142 |
| | | | | 285/248 |
| 9,488,300 B2* | 11/2016 | Kishi | ............... | F16L 17/032 |
| 2005/0218651 A1* | 10/2005 | Lamm | ............... | F16L 37/092 |
| | | | | 285/321 |
| 2011/0036081 A1* | 2/2011 | Lechner | ............ | F16L 21/08 |
| | | | | 60/303 |
| 2014/0035282 A1* | 2/2014 | Kishi | ............... | F16L 17/032 |
| | | | | 285/374 |
| 2015/0292656 A1* | 10/2015 | Kishi | ............... | F16L 21/04 |
| | | | | 251/151 |

FOREIGN PATENT DOCUMENTS

| | | | | |
|---|---|---|---|---|
| FR | 2830071 A1 * | 3/2003 | .......... | F16L 37/0915 |
| GB | 2213895 A | 8/1989 | | |

OTHER PUBLICATIONS

UK Search Report for corresponding Application No. GB1418840.3 (2015; 3 pages).*

* cited by examiner

COUPLING UNIT, COUPLING DEVICE, MOTOR VEHICLE AND METHOD

CROSS REFERENCE TO RELATED APPLICATION

This application claims priority to German Patent Application No. 102013018344.8 filed Oct. 31, 2013, which is incorporated herein by reference in its entirety.

TECHNICAL FIELD

The present disclosure relates to a coupling unit for a coupling device of a motor vehicle, a coupling device with such a coupling unit, a motor vehicle with such a coupling device and/or with such a coupling unit and a method for operating a coupling device.

BACKGROUND

Coupling devices are generally known. They serve for connecting sections of medium-conveying systems to one another in a sealed fashion. To this end, a medium-conveying plug element is inserted into a support sleeve and fixed therein. The support sleeve forms part of a coupling unit and features a sliding element in its interior, as well as a sealing element that is clamped between the support sleeve and the sliding element in a release position. When the medium-conveying plug element is inserted, the sliding element is carried along by the plug element and displaced in the inserting direction such that the sealing element is released.

In a coupling device disclosed in U.S. Pat. No. 3,853,336, the sliding element adjoins and slides along the inner side of the support sleeve and is arranged between the plug element and the support sleeve in the coupled arrangement of the medium-conveying plug element in the support sleeve. In such an arrangement, a gap between the plug element and the support sleeve with a thickness corresponding to the difference between the outside diameter and the inside diameter of the sliding element can never be entirely prevented such that the tightness of this arrangement is reduced. In U.S. Pat. No. 3,853,336, two sealing elements are provided in order to ensure the tightness of the coupling unit. However, this is cumbersome and cost-intensive.

SUMMARY

An embodiment of the present disclosure can be seen in respectively proposing a coupling unit and a coupling device, by means of which a sealed connection between the plug element and the coupling unit can be quickly produced in a simple and cost-effective fashion. The coupling unit includes at least one support sleeve having a sleeve opening that extends continuously in the longitudinal direction into which at least one medium-conveying plug element can be at least partially inserted. The support sleeve features at least one circumferential pocket on an inner side that faces the plug element and defines the sleeve opening transverse to the longitudinal direction. At least one sliding element can be arranged in the pocket and movable at least in the longitudinal direction and transferred from a release position into a coupling position during the insertion of the plug element. At least one sealing element is arranged between the sliding element and the pocket of the support sleeve in the release position and pre-stressed in the direction of the plug element. The sealing element is released by the sliding element in the coupling position in order to close and seal a potential gap formed between the support sleeve and the plug element in the longitudinal direction.

The sleeve opening in the support sleeve may include a hollow space that is accessible through one opening only. However, it is advantageous if the sleeve opening is realized continuously in the longitudinal direction, i.e. accessible from outside through at least two openings. It would furthermore be conceivable that the sleeve opening has a varying cross section over its extent in the longitudinal direction such as, e.g., cross sections with widening or narrowing segments. However, the support sleeve can be easily and cost-effectively manufactured if the sleeve openings have the same cross section along their extent in the longitudinal direction. The medium-conveying plug element preferably has an outside contour that corresponds to the cross section of the sleeve opening referred to the longitudinal direction, particularly corresponding or complementary to the cross section of the sleeve opening.

The pocket formed in the support sleeve may include a segment of the sleeve opening, in which the cross section of the sleeve opening is widened. This segment may be defined in such a way that the sleeve opening continues with the previous sleeve cross section after the segment referred to the longitudinal direction. It would furthermore be conceivable that the sleeve opening continues up to one of the ends of the support sleeve with the widened cross section forming the pocket, i.e. is accessible from outside. In this case, the sliding element can be easily arranged in the pocket.

Due to the fact that the sliding element can be arranged in the pocket of the support sleeve, a prevailing gap between the plug element and the support sleeve can be prevented within the support sleeve in the coupled arrangement of the plug element. In this case, the outside cross section of the plug element may be realized corresponding to the cross section of the sleeve opening such that a virtually sealed arrangement of the plug element in the support sleeve can be easily achieved. A potential prevailing gap between the plug element and the support sleeve caused by manufacturing tolerances can in this case be easily and cost-effectively closed in the longitudinal direction by means of the at least one sliding element.

In order to easily receive the plug element by the sliding element and to ensure a displacement of the sliding element when the plug element is inserted, it is advantageous if the sliding element is realized in a sleeve-like fashion and on its side facing the inserting direction includes an opening that corresponds to the opening of the support sleeve and into which the sliding element can be inserted and/or if the sliding element includes on its side facing away from the opening an end face that extends transverse to the inserting direction and against which the sliding element can be placed in a contacting fashion. It is furthermore advantageous if the sliding element includes a slot that extends in the longitudinal direction or if the sliding element includes a body that is closed transverse to the longitudinal direction.

The sliding element may basically be realized arbitrarily. If the pocket in the support sleeve extends up to one end of the support sleeve, i.e. if the pocket is accessible from outside, the sliding element may have a closed cross section. If the pocket is arranged within the support sleeve and provides no access from one end, it is advantageous if the sliding element includes a slot that extends in the longitudinal direction and makes it possible to reduce the sliding element with respect to its cross section such that it can be inserted into the sleeve opening. In this case, the cross section of the sliding element is automatically widened again as soon as the sliding element is arranged within the pocket.

In order to define the release position and the coupling position, it is advantageous if the coupling unit includes a first stop that makes it possible to limit at least a motion of the sliding element in the inserting direction and to define the coupling position and/or if the coupling unit includes a second stop that makes it possible to limit at least a motion of the sliding element opposite to the inserting direction and to define the release position.

In an enhancement of the last-mentioned embodiment, it is advantageous if the first stop comprises an edge of the side of the pocket of the support sleeve that faces away from the inserting direction and/or a first, in particular, sleeve-like stopping element that can be inserted into the support sleeve and/or if the second stop comprises an edge of the side of the pocket of the support sleeve that faces the inserting direction and/or a second, in particular, sleeve-like stopping element that can be inserted into the support sleeve.

If the first stop or the second stop comprises an edge of the support sleeve and the other respective stop comprises a stopping element that can be inserted into the support sleeve, the sliding element can have a closed cross section referred to the longitudinal direction and be easily arranged in the pocket. After the arrangement of the sliding element in the pocket, this pocket can be closed with the insertable stopping element.

If the first stop and the second stop are formed by an edge of the support sleeve, the coupling unit can be manufactured with fewer components.

In an enhancement of the last-mentioned embodiment, it is advantageous if the first stopping element and/or the second stopping element essentially end flush with the support sleeve in the longitudinal direction thereof or protrude over the support sleeve in the longitudinal direction and/or if the first stopping element and/or the second stopping element comprise a pusher, by means of which the sliding element can be transferred from the coupling position and the release position opposite to the inserting direction.

If the first stopping element or the second stopping element protrudes over the support sleeve in the longitudinal direction, it can be easily actuated from outside. In this way, the sliding element can be moved back from the coupling position into the release position. The sealing element can thereby be displaced outward again and the plug element can be removed. In this case, the sliding element, the first stopping element and/or the second stopping element are movably arranged in the support sleeve.

In order to simplify the return of the sliding element from the coupling position into the release position, it is proposed in one embodiment of the coupling unit that the sliding element comprises a bevel on the side facing the inserting direction, namely on the surface facing the sealing element.

Due to this bevel, the sealing element can be displaced outward again and arranged between the sliding element and the support sleeve in order to once again release the plug element for its removal from the support sleeve.

It would also be conceivable that the support sleeve, the sliding element, the first stopping element, the second stopping element and/or the plug element has an arbitrary cross section referred to the longitudinal direction. A cross section may, e.g., be n-angled such as quadrangular, hexagonal or octagonal. The coupling unit has a simple and cost-effective construction if the support sleeve, the sliding element, the first stopping element, the second stopping element and/or the plug element are cylindrical or comprise a hollow-cylindrical segment.

In order to achieve a particularly sound sealing effect of the coupling unit, it is proposed in one embodiment of the coupling unit that the support sleeve and the sliding element have the same inside diameter and/or that the depth of the pocket of the sliding element corresponds to the wall thickness of the support sleeve. This prevents the sliding element from protruding into the sleeve opening such that the medium-conveying plug element may have an outside contour that can be realized corresponding, in particular complementary, to the cross section of the sleeve opening.

It would basically be conceivable to arbitrarily arrange the sealing element between the sliding element and the pocket of the support sleeve in the release position. However, it is advantageous if the sealing element is in the release position arranged between a recess formed in the pocket and/or in the sliding element. The sealing element may basically be configured arbitrarily. It can be easily and cost-effectively realized if the sealing element includes an O-ring.

The present disclosure also provides a coupling device for medium-conveying systems of a motor vehicle that features at least one medium-conveying plug element and at least one coupling unit with at least one support sleeve including a sleeve opening that extends, in particular, continuously in the longitudinal direction and into which at least the medium-conveying plug element can be at least partially inserted. The support sleeve features at least one circumferential pocket on an inner side that faces the plug element and defines the sleeve opening transverse to the longitudinal direction, with at least one sliding element that can be arranged in the pocket movably at least in the longitudinal direction and transferred from a release position into a coupling position during the insertion of the plug element, and with at least one sealing element that is arranged between the sliding element and the pocket of the support sleeve in the release position and pre-stressed in the direction of the plug element. The sealing element is released by the sliding element in the coupling position in order to close and seal a potential gap formed between the support sleeve and the plug element in the longitudinal direction.

The present disclosure furthermore provides a motor vehicle that features at least one coupling unit, particularly with at least one of the aforementioned characteristics, and/or at least one coupling device, particularly with at least one of the aforementioned characteristics.

The present disclosure also provides a method for operating a coupling device, particularly with at least one of the aforementioned characteristics, that features at least one medium-conveying plug element and at least one coupling unit of a motor vehicle, particularly with at least one of the aforementioned characteristics. The device is operated by inserting the plug element into a sleeve opening of a support sleeve of the coupling unit along an inserting direction; transferring a sliding element arranged in a pocket of the support sleeve from a release position into a coupling position during the insertion of the plug element; releasing a sealing element that is arranged between the sliding element and the pocket of the support sleeve in the release position and pre-stressed in the direction of the plug element; and closing and sealing a potential gap formed between the support sleeve and the plug element in the longitudinal direction in the coupling position with the sealing element.

In an enhancement of this method, the coupling may be carried out by manually or automatically transferring the sliding element from the coupling position into the release position; displacing the sealing element into an arrangement between the sliding element and the pocket of the support sleeve by means of the sliding element; and if necessary removing the plug element from the sleeve opening of the support sleeve.

The coupling unit, the coupling device, the motor vehicle and the method have several advantages. Due to the fact that the sliding element can be arranged in a pocket, a prevailing gap between the plug element and the support sleeve can be reduced in the coupling position. The tightness of the coupling device is thereby improved. Other characteristics, details and advantages of the present disclosure can be gathered from the attached claims, the drawings and the following description of preferred embodiments of the coupling unit and the coupling device.

BRIEF DESCRIPTION OF THE DRAWINGS

The present disclosure will hereinafter be described in conjunction with the following drawing figures, wherein like numerals denote like elements.

DETAILED DESCRIPTION

Figure 1:
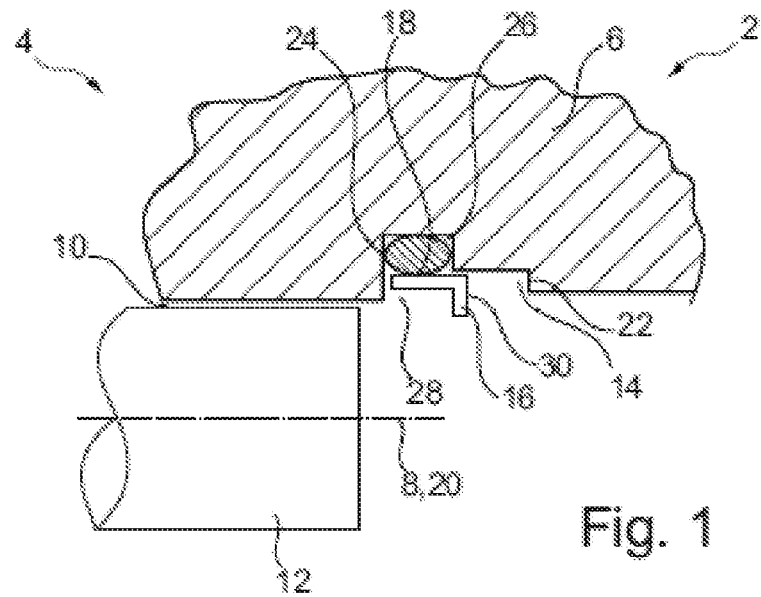
FIG. 1 shows a schematic sectional view of a first exemplary embodiment of the coupling unit in the release position.

The following detailed description is merely exemplary in nature and is not intended to limit the present disclosure or the application and uses of the present disclosure. Furthermore, there is no intention to be bound by any theory presented in the preceding background or the following detailed description.

The figures show a coupling unit for a coupling device 4 of a motor vehicle that is altogether identified by the reference symbol 2. The coupling unit 2 includes a support sleeve 6 with a sleeve opening 10 that continuously extends in a longitudinal direction 8. A medium-conveying plug element 12 of the coupling device 4 can be at least partially inserted into the sleeve opening 10 extending in the longitudinal direction 8 and fixed therein.

The support sleeve 6 includes a circumferential pocket 14 transverse to the longitudinal direction 8 on its inner side that faces the plug element 12 and defines the sleeve opening 10 transverse to the longitudinal direction 8. A sliding element 16 is arranged in the pocket 14 and can be transferred from a release position into a coupling position during the insertion of the plug element 12. When the sliding element 16 is transferred from the release position into the coupling position, a sealing element 18 that is arranged between the sliding element 16 and the pocket 14 of the support sleeve 6 and pre-stressed in the direction of the medium-conveying plug element 12 is released, wherein the sealing element closes and seals a potential gap formed between the support sleeve and the plug element 12 in the longitudinal direction 8 in the coupling position.

In the exemplary embodiments illustrated in FIGS. 1 to 6, the support sleeves 6, the plug element 12 and the sliding elements 18 respectively consist of a cylindrical or hollow-cylindrical component such that the longitudinal direction 8 simultaneously represents an axis 20.

Figure 2:
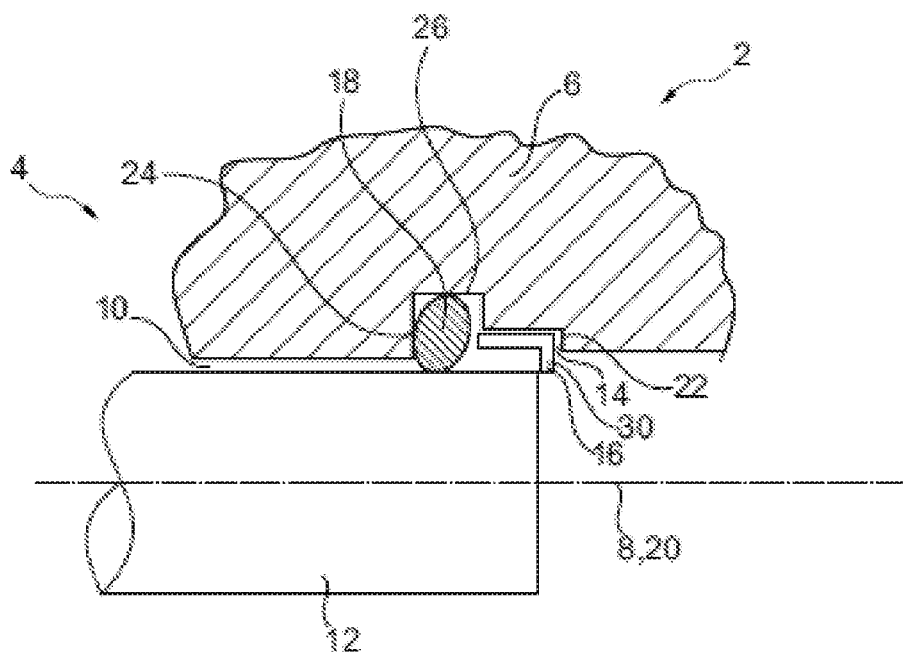
FIG. 2 shows a schematic sectional view of an exemplary embodiment of the coupling unit according to FIG. 1 in the coupling position.

FIGS. 1 and 2 show a first exemplary embodiment of the coupling unit 2. In this exemplary embodiment, the pocket 14 is defined by a first stop 22 realized in the form of an edge of the support sleeve 6 and a second stop 24 realized in the form of an edge. The sliding element 16 adjoins the first stop 22 in the coupling position (see FIG. 2). In the release position, the sliding element 12 adjoins the second stop 24.

The sealing element 18 is arranged in a recess 26 formed in the pocket 14. The sliding element 16 includes an opening 28 and an end face 30 that is arranged on the side of the sliding element 16 facing away from the plug element 12. The plug element 12 can be inserted into the opening 28 and placed against the end face 30 in order to transfer the sliding element 16 from the release position into the coupling position during the insertion of the plug element 12. The sleeve opening 10 and the inner diameter of the sleeve-like sliding element 16 have the same inside diameter.

In the exemplary embodiments illustrated in the figures, the minimum depth of the pocket 14 corresponds to the difference between the outside diameter and the inside diameter of the sliding element 16. This prevents the sliding element 16 from protruding into the sleeve opening 10 in order to form a gap between the plug element 12 and the sleeve opening 10 in the coupling position.

Figure 3:
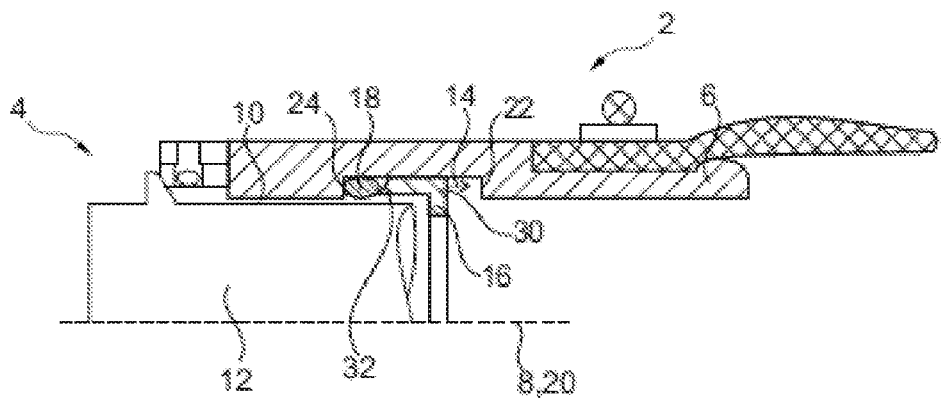
FIG. 3 shows a schematic sectional view of a second exemplary embodiment of the coupling unit.

FIG. 3 shows a second exemplary embodiment of the coupling unit 2, in which the sealing element 18 is not arranged in a recess 26 in the release position as illustrated in FIGS. 1 and 2, but rather merely clamped between the pocket 12 of the support sleeve 6 and the sliding element 16. On its side that faces the plug element 12, the sliding element 16 includes a bevel 32 in order to arrange the sealing element 18 in the release position.

Figure 4:
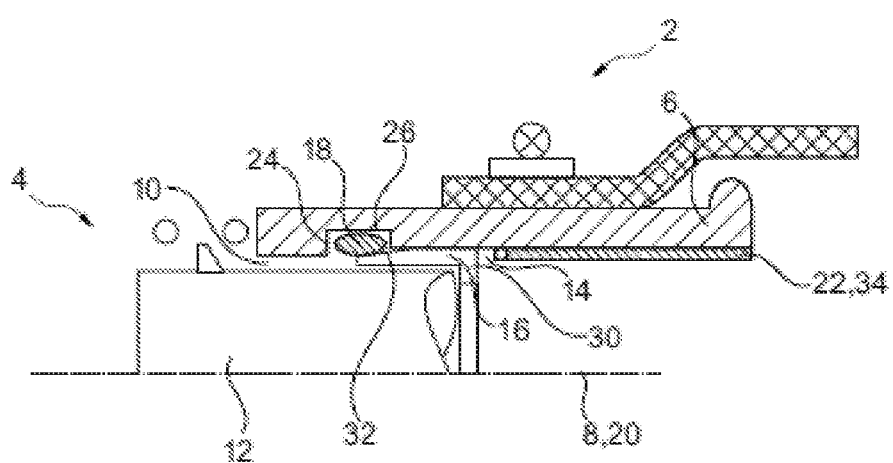
FIG. 4 shows a schematic sectional view of a third exemplary embodiment of the coupling unit.

FIG. 4 shows a fourth exemplary embodiment of the coupling unit 2, in which the sliding element 16 includes the bevel 32 and a recess 26 is additionally provided in the pocket 14 of the support sleeve 6. In the third exemplary embodiment illustrated in FIG. 4, the first stop 22 is furthermore formed by a sleeve-like second stopping element 34. This second stopping element can be arranged in the sleeve opening 10 of the support sleeve 6 and has an inside diameter that corresponds to the inside diameter of the sleeve opening 10 of the support sleeve 6. The sliding element 16 can thereby be easily arranged in the pocket 14 and the pocket 14 can also be easily defined by the second stop 24.

Figure 5:
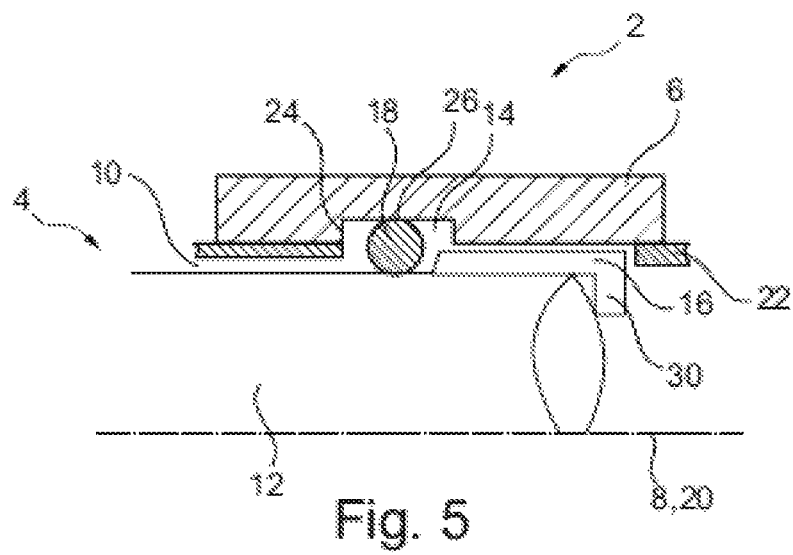
FIG. 5 shows a schematic sectional view of a fourth exemplary embodiment of the coupling unit.

FIG. 5 shows a third exemplary embodiment of the coupling unit 2, in which the second stop 24 is also formed by a second stopping element 36. Consequently, the pocket of the support sleeve 6 is defined by two sleeve-like stopping elements 34 and 36 that can be inserted into the support sleeve 6.

Figure 6:
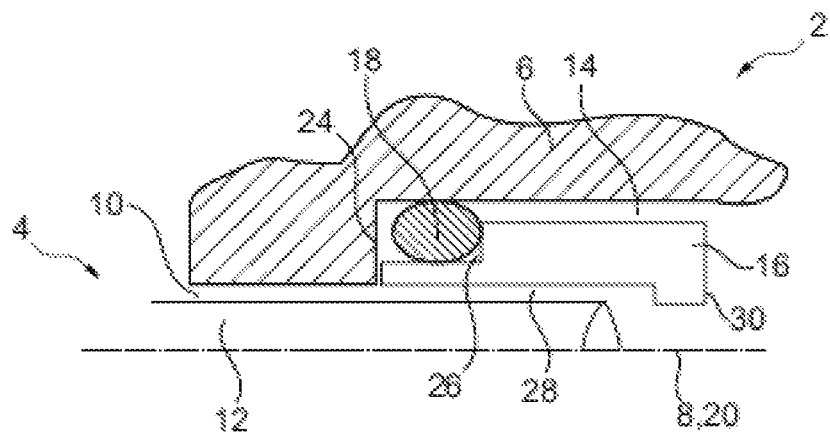
FIG. 6 shows a schematic sectional view of a fifth exemplary embodiment.

FIG. 6 shows a fifth exemplary embodiment of the coupling unit 2, wherein the recess 26, in which the sealing element 18 can be arranged in the release position, is arranged in the sliding element 16.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A coupling unit for a coupling device of a motor vehicle comprising:
   a support sleeve having a sleeve opening extending in a longitudinal direction and at least one circumferential pocket formed on an inner side;
   a medium-conveying plug element at least partially inserted into the support sleeve;
   a sliding element arranged in the pocket and movable at least in the longitudinal direction from a release position into a coupling position during the insertion of the plug element; and
   a sealing element disposed between the sliding element and the pocket of the support sleeve in the release position and pre-stressed towards the plug element;
   wherein said sealing element is released by the sliding element in the coupling position in order to close and seal a gap formed between the support sleeve and the plug element in the longitudinal direction;
   a first stop operable to limit at least a motion of the sliding element in an inserting direction and define the coupling position,
   wherein the first stop comprises an edge of the side of the pocket of the support sleeve that faces away from the inserting direction and a first stopping element configured to be inserted into the support sleeve.

2. The coupling unit according to claim 1, wherein the sealing element comprises an O-ring.

3. The coupling unit according to claim 1, wherein the sliding element comprises a bevel on a side facing the sealing element.

4. The coupling unit according to claim 1, wherein the sliding element comprises a slot that extends in the longitudinal direction.

5. The coupling unit according to claim 1, wherein the sliding element comprises a body that is closed transverse to the longitudinal direction.

6. The coupling unit according to claim 1, wherein the support sleeve, the sliding element and the plug element are cylindrically shaped and further comprise a hollow-cylindrical segment.

7. The coupling unit according to claim 1, wherein the support sleeve and the sliding element have the same inside diameter.

8. The coupling unit according to claim 1, wherein a depth of the pocket of the sliding element corresponds to a wall thickness of the support sleeve.

9. The coupling unit according to claim 1, wherein the sealing element is in the release position arranged between a recess formed in at least one of the pocket and in the sliding element.

10. The coupling unit according to claim 1, wherein the sliding element comprises a sleeve element having an opening on a side facing an inserting direction that corresponds to the opening of the support sleeve and into which the sliding element is inserted.

11. The coupling unit according to claim 10, wherein the sliding element further comprises an end face on a side facing away from the opening that extends transverse to the inserting direction and against which the sliding element is configured to be placed in a contacting fashion.

12. The coupling unit according to claim 1 further comprising a second stop configured to limit at least a motion of the sliding element opposite to the inserting direction and define the release position.

13. The coupling unit according to claim 12, wherein the second stop comprises an edge of the side of the pocket of the support sleeve that faces the inserting direction and a second stopping element configured to be inserted into the support sleeve.

14. The coupling unit according to claim 13, wherein at least one of the first and second stopping elements ends flush with the support sleeve in the longitudinal direction thereof.

15. The coupling unit according to claim 13, wherein at least one of the first and second stopping elements protrudes over the support sleeve in the longitudinal direction.

16. The coupling unit according to claim 13, wherein at least one of the first and second stopping elements comprises a pusher, by means of which the sliding element is transferred from the coupling position and the release position opposite to the inserting direction.

* * * * *